United States Patent [19]

Rose

[11] 4,313,524

[45] Feb. 2, 1982

[54] BULK ACOUSTIC ABSORBER PANELS FOR USE IN HIGH SPEED GAS FLOW ENVIRONMENTS

[75] Inventor: Philip M. Rose, Chula Vista, Calif.

[73] Assignee: Rohr Industries, Inc., Chula Vista, Calif.

[21] Appl. No.: 217,209

[22] Filed: Dec. 17, 1980

[51] Int. Cl.³ .......................... E04B 1/82; F01N 1/24
[52] U.S. Cl. .................................... 181/291; 181/222
[58] Field of Search ............... 181/213, 214, 222, 224, 181/286, 290, 291–293; 55/276; 428/116–118

[56] References Cited

U.S. PATENT DOCUMENTS

| | | | |
|---|---|---|---|
| 3,061,491 | 10/1962 | Sherrard et al. | 181/290 X |
| 3,166,149 | 1/1965 | Hulse et al. | 181/292 |
| 3,211,253 | 10/1965 | Gonzalez | 181/292 |
| 3,502,171 | 3/1970 | Cowan | 55/276 X |
| 3,630,312 | 12/1971 | Woodward et al. | 181/292 |
| 3,712,846 | 1/1973 | Daniels et al. | 181/290 X |
| 3,948,347 | 4/1976 | Rutledge | 181/291 |
| 3,977,492 | 8/1976 | Hankel | 181/292 |
| 4,056,161 | 11/1977 | Allen, Jr. | 181/290 |
| 4,235,303 | 11/1980 | Dhoore et al. | 181/214 |

Primary Examiner—L. T. Hix
Assistant Examiner—Benjamin R. Fuller
Attorney, Agent, or Firm—Patrick J. Schlesinger; Frank D. Gilliam

[57] ABSTRACT

A sandwich type acoustical absorbing panel for use adjacent high speed gas flow areas in and around the engines of high speed aircraft. The panel comprises a pan type base having an imperforate base member and upstanding sides and end walls, an acoustic absorbing medium is disposed within the pan type base, a rigid perforated plate is secured to the distal surfaces of the upstanding sides and end walls for enclosing the acoustic absorbing medium and a sheet of fine woven mesh is secured to the outer surface of the rigid perforated plate. The outer positioned fine woven mesh enhances acoustic properties of the panel and substantially prevents entry of water, dust, chemicals and similar foreign matter from penetrating into the panel structure and reduces the aerodynamic drag loss normally encountered by high speed gas flows across perforated material, such as, that normally used for the outer surface of acoustic panels.

5 Claims, 2 Drawing Figures

BULK ACOUSTIC ABSORBER PANELS FOR USE IN HIGH SPEED GAS FLOW ENVIRONMENTS

BACKGROUND OF THE INVENTION

1. Field of Invention

This invention relates to acoustic panels, and more particularly to panels usable in and around high speed gas flow areas of aircraft including the use as liners for jet and turbo-jet engines.

2. Description of the Prior Art

A preliminary search on the subject matter of this invention revealed Rutledge, U.S. Pat. No. 3,948,347; Cowan, U.S. Pat. No. 3,502,171; and Hankel, U.S. Pat. No. 3,977,492. These patents disclose sound absorbent materials having some of the elements found in the present invention, but neither patent suggests the combination of components presently disclosed and claimed which have been found to yield superior sound absorbing qualities, resistance to severe environment, provide a smooth near turbulance free high speed gas exposed surface and provides substantially no penetration of foreign matter into the acoustic material.

Other U.S. Patents of general interest which were found in the search are as follows:
U.S. Pat. No. 3,061,491; Sherrard, et al., Oct. 30, 1962
U.S. Pat. No. 3,166,149; Hulse, et al., Jan. 19, 1965
U.S. Pat. No. 3,211,253; Gonzalez, Oct. 12, 1965
U.S. Pat. No. 3,630,312; James R. Woodward
U.S. Pat. No. 3,712,846; Daniels, et al., Jan. 23, 1973
U.S. Pat. No. 4,056,161; Allen, Nov. 1, 1977

SUMMARY OF THE INVENTION

It is an object of this invention to provide an improved sandwich type acoustical panel which permits sound to enter with a minimum of surface resistance to high speed gas flow thereacross that provides a high degree of sound absorbtion.

Another object of this invention is to provide an improved sandwich type acoustical panel which has sufficient mechanical strength for use in severe environments, such as, high speed gas flow areas of modern high speed aircraft engines.

Still another object of this invention is to provide an improved sandwich type acoustic structure which is substantially impervious to water, dust, chemical and various other encountered contaminants.

The illustrated embodiment of this invention comprises a base or pan structure with upright side and end walls, an acoustic absorbing bulk material disposed therein, a rigid perforated sheet material confining the acoustic absorbing material within the base of pan structure and an overlay on the rigid perforated material of a finely woven metallic or non-metallic mesh material.

DESCRIPTION OF THE PREFERRED EMBODIMENT

Figure 1:
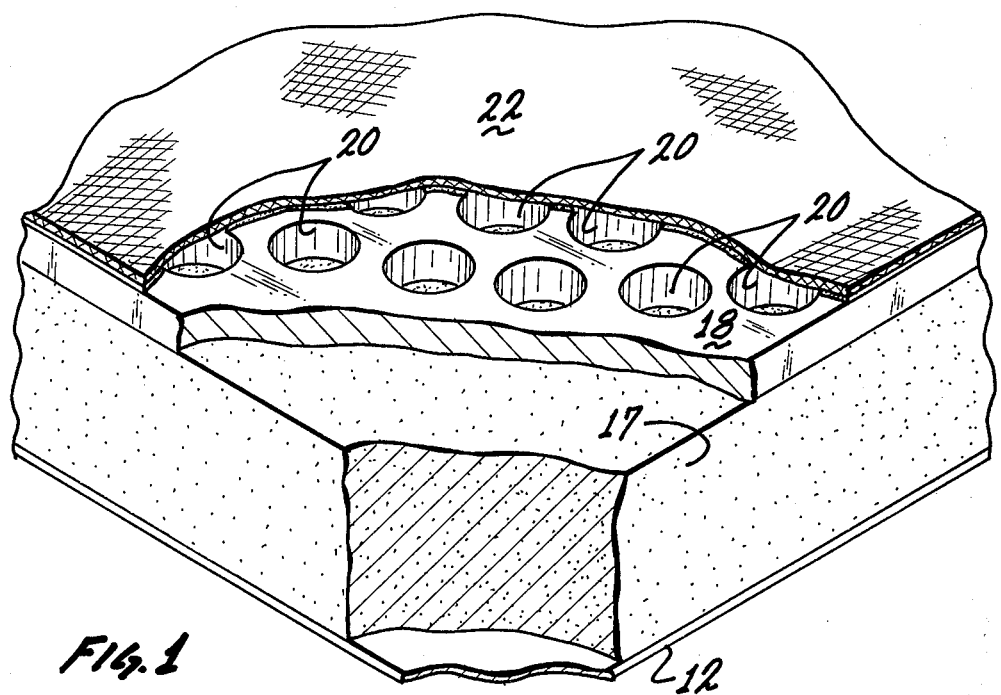
FIG. 1 is a perspective cross-sectional view of an acoustic panel constructed in accordance with the invention.
Figure 2:
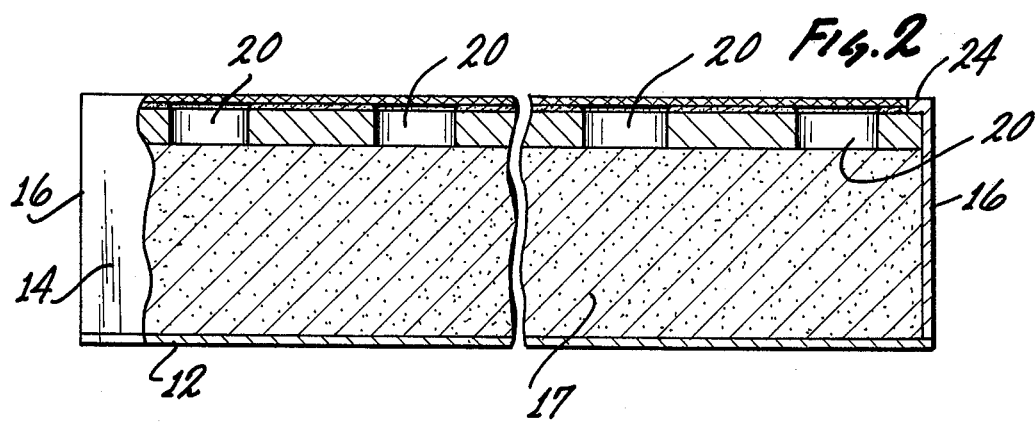
FIG. 2 is an end view of the FIG. 1 showing.

The acoustical panel of the invention is generally shown at 10. An imperforate base or pan member 12 is shown having endwalls 14 and side walls 16. Disposed within the base member 12 is positioned a bulk absorbing material 17 of porous construction with many small torturous air passages therethrough and may be in the form of open celled foams, fiberglass batts, felt, Kevlar ® or any other material found suitable for sound absorbtion. A perforated rigid metal face plate 18 is secured to walls 14, 16 by any conventional manner, such as, brazing, welding, adhesive bonding or the like. The perforated rigid metallic or non-metallic face sheet 18 has a plurality of perforations 20 therethrough which could range in size, for example, from 0.030 inches to 0.15 inches in diameter. The principle objective of the perforation size is to provide a rigid sheet with from 15% to 40% actual open area and yet provide sufficient strength to the ultimate sandwich structure for the purpose intended.

A face sheet 22 of porous fibrous material is adhesively bonded to one surface of the perforated face sheet 18. The face sheet 22 is a stainless steel Dutch Twill woven material or the like. Other types of material and weave patterns may also be utilized to successfully practice this invention. The adhesive coating for bonding the perforate face sheet 18 to the face sheet 22 is typically either AF-31 manufactured by the 3-M Company, metal bond 4021 manufactured by Narmco, FM-300 manufactured by Bloomingdale Aerospace Products, or adhesives having the same or similar characteristics. These adhesives generally consist of a low solid to solvent solution. When the solvents are removed from these solutions by, for example, evaporation, the viscosity index is elevated.

The adhesive coating for bonding the perforated sheet 18 to the face sheet 22 of porous fibrous material is preferably applied by spraying on one surface of the perforated sheet 18 a thin layer of the aforementioned adhesive. The solvent from the adhesive is then removed by evaporation. The surface attraction forces cause the adhesive layer around each perforation 20 of the perforated sheet 18 to take a rounded, funnel like shape upon removal of the solvent. The now substantially solid or highly viscous adhesive remaining retains this funnel like shape, and later during the cure cycle does not soften and flow but merely becomes tacky sufficient to adhere to rather than flow into the pores of the face sheet 22. The adhesive layers also provide for electrical or galvanic insulation between dissimilar materials of construction, i.e., adjacent aluminum and stainless steel.

The inherent behavior of the selected adhesive material effectively enlarges the openings into the perforations 20 at the entrance side of the core cells of the product, providing enhanced acoustic open area. An example is the use of a perforated sheet 14 having an actual geometric open area of approximately 34% wherein the final product has an effective open area of approximately 42% or an increase of over 10%. This increase in effective open area can only be attributed to the rounded funnel like openings into the perforations 22 created by the layer of adhesive treated in the manner prescribed. The thickness of this adhesive layer is in the range of 0.001 to 0.004 of an inch.

It has been found that their effective open area can be further enhanced by a layer of adhesive in the range of 0.003 to 0.004 of an inch thick. The thickness of the adhesive layer can be increased by adding successive thin layers of adhesive. Effective open areas of approximately 50% have been achieved using a sheet of perforated material having an actual open area of approximately 34%. The fine mesh of the porous fibrous material 22 substantially prevents entry of contaminants into the area of the bulk absorber material.

In construction of the panel, the face sheet and bulk absorber are selected so that when combined they provide an efficient acoustic structure. The perforated sheet and porous fibrous material are bonded together. A layer of adhesive is applied to the surface of the perforate sheet to which the porous fibrous material is to be attached and then the solvent is removed. The porous fibrous material is then placed on the layer of adhesive. A positive pressure is applied forcing the materials together during cure. In the case where more than one layer of adhesive is used, solvent is removed from the layers and the layers are successively cured except for the last layer which is left uncured for joining with the perforated sheet as discussed above.

The now combined perforated sheet 18 and porous fibrous material 22 is attached to outer surface of the end and side walls of the base member 12 as aforementioned. The end and side walls would generally have a slight inward extending lip or attaching edge 24 for this attachment.

The materials of construction for the pan, side and end walls and perforated sheet may include aluminum, titanium or other types of metal or non-metal materials generally used in aircraft structures.

Although the foregoing invention has been described in some detail by way of illustration and example, for the purposes of clarity of understanding, it should be understood that certain changes and modifications may be practiced within the spirit of the invention as limited only by the scope of the appended claims.

What is claimed as new and useful and desired to be secured by United States Letters Patent is:

1. A structurally efficient acoustic absorber panels comprising:
   a rigid open base member which comprises a back plate, end and side walls;
   acoustic absorber means disposed within the opening of said rigid base member;
   a rigid perforated plate is attached to said end and side walls for forming a cover for said opening of said rigid base member for enclosing said acoustic absorber means, the perforations of said perforated sheet are sufficient in number and cross-section to provide a large actual open area therethrough; and
   a layer of fine woven wire cloth material is adhered by adhesive means to the outer surface of said perforated sheet, the pores through said sheet of said wire cloth material provide a pre-determined flow through resistance through the combined perforated sheet and layer of wire cloth material,
   whereby a high speed gas flow across said layer of fine woven wire cloth material encounters a minimum of surface resistance, and provides a high degree of sound absorbtion while substantially impervious to water, dust, chemical and various other contaminants.

2. The invention as defined in claim 1, wherein said acoustic absorber means is open celled plastic foam.

3. The invention as defined in claim 1, wherein said acoustic absorber means is batts of fiberglass material.

4. The invention as defined in claim 1, wherein said acoustic absorber means is felt material.

5. The invention as defined in claim 4, wherein said felt material is constructed of Kevlar ®.

* * * * *